United States Patent Office 2,770,651
Patented Nov. 13, 1956

2,770,651

PREPARATION OF 2-METHYL-4 CHLORO-PHENOXY-ACETIC ACID

Alex Hlynsky, Painesville, Ohio, assignor to Diamond Alkali Company, Cleveland, Ohio, a corporation of Delaware No Drawing. Application April 27, 1954,
Serial No. 426,038

7 Claims. (Cl. 260—521)

This invention relates to improvements in the manufacture of organic compounds, and more particularly relates to the manufacture of chlorinated cresoxyacetic acid. The expression "chlorinated cresoxyacetic acid," as used in the specification and claims, unless otherwise indicated, is intended to include functional derivatives of that acid, including esters, amides, and salts thereof.

Chlorinated cresoxyacetic acid, particularly 2-methyl-4-chlorophenoxyacetic acid, is a known effective hormone-type weed killer having general herbicidal properties. The material is preferred, in some instances, over 2,4-dichlorophenoxyacetic acid (2,4–D), particularly in those applications for cereal crops grown in relatively cool climates. The particular effectiveness arises both from the toxicity of 2-methyl-4-chlorophenoxyacetic acid against undesired weeds, such as Canada thistle, whitetop, and certain species of the mustard family, as well as high toleration by cereal crops to the use of the material, such as crops including flax, oats, wheat, barley, rye, and rice. Hence, the material is thoroughly established as a useful herbicidal composition and has gone into relatively wide use in formulations for application to such crops.

Various methods have heretofore been proposed for the manufacture of 2-methyl-4-chlorophenoxyacetic acid. For example, it has been proposed to chlorinate cresol and to condense the chlorinated product with monochloroacetic acid to obtain 2-methyl-4-chlorophenoxyacetic acid. However, such a process produces a yield rarely in excess of 65% of desired product, the remaining portion being the 2-methyl-6-chloro isomer and other unwanted materials. Such materials, although apparently not unduly toxic to cereal crops and the like, to which the materials are applied, are useless as weed killers and therefore amount to inert diluents in the ultimate material. Hence, the wastage of upwards of 35% to 40% of the raw material employed renders such a process uneconomical.

In the case of the related 2,4-dichlorophenoxyacetic acid, it has been proposed to synthesize it by the condensation of phenol with monochloracetic acid, followed by dichlorination of the resultant condensation product. It has been proposed to accomplish this dichlorination by employing molten phenoxyacetic acid and chlorinating it under various conditions. This proposal has failed of adoption, primarily since high temperatures of chlorination are required, and since losses of chlorine and a degradation of the phenoxyacetic acid are necessarily encountered. Moreover, upon chlorination of the phenoxyacetic acid, there is a considerable yield of undesired isomers which reduces the value of the ultimate product and, again, amounts to a wastage of raw material.

It has also been proposed, in connection with the manufacture of 2,4-dichlorophenoxyacetic acid, to condense phenol with monochloracetic acid and to follow this condensation reaction by dichlorination, in stepwise stages. This process, however, apparently is not adapted for commercial operation, since the best yield of the desired 2,4-dichlorophenoxyacetic acid product obtained is of the order of 80%.

The present invention has for its principal object the production of 2-methyl-4-chlorophenoxyacetic acid with substantially 100% active isomer in a high yield. The formula for this compound is

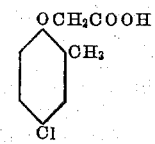

According to the present invention, 2-methyl-4-chlorophenoxyacetic acid is prepared by reacting orthocresol and chloracetic acid, preferably monochloracetic acid, in an alkaline aqueous medium, and subsequently chlorinating the reaction mass with hypochlorite ions.

More particularly, the method of the present invention comprises the addition to the cresol-chloracetic acid reaction mass of an alkali metal hydroxide or alkali metal carbonate, and chlorine. The reactants may be added either separately or as a mixture, the quantities in either event being sufficient to produce a chlorinating amount of hypochlorite ions in solution.

It will be understood, of course, that the conditions under which the reaction is accomplished may vary somewhat and that this invention contemplates the use of hypochlorite as a chlorinating agent, whether added as a separate reagent or produced in situ. The term "alkali metal," as used in the specification and claims, is intended to mean a monovalent element selected from elements in the first group of the Periodic Table, i. e., sodium, potassium, lithium, rubidium, and cesium, preferably sodium or potassium.

In the practice of this invention, it is preferable to employ a reaction medium which is slightly alkaline and to maintain the desired alkalinity with an alkali metal carbonate, such as sodium carbonate or potassium carbonate. For optimum results, the pH of the reaction medium should be maintained between about 7.0 and about 9.0 during chlorination. If the pH is greater than about 9.0, the chlorination proceeds too slowly. On the other hand, if the pH is less than about 7.0, the acid condition causes the formation of undesired precipitates.

While the reaction temperature may be varied, it is generally desirable to operate at a relatively low reaction temperature, i. e., of the order of 0° C. In most instances, it is essential that the reaction temperature be maintained below 10° C., a higher temperature resulting in the conversion of the hypochlorite into an oxidizing agent.

Following the addition of the hypochlorite, whether by adding a mixture of an alkali metal hydroxide, or an alkali metal carbonate, and chlorine, or hypochlorite per se, the reaction is continued for a sufficient period of time to accomplish the desired chlorination, a typical reaction time being about 1.5 hours. The desired product, 2-methyl-4-chlorophenoxyacetic acid, is obtained from the reaction mass by acidification, using an acid such as sulfuric acid, or a halogen acid such as hydrochloric acid or hydrobromic acid.

From the description thus far, it will be understood that the present invention adds a source of hypochlorite ions as a chlorinating agent directly to the reaction mass of the condensation of orthocresol and chloracetic acid with no acidification step to obtain the intermediate cresoxyacetic acid. Hence, in contrast to prior methods, both the need for a separate acidification step and the cost of such an acid addition are eliminated, with the surprising result that not only is an improved yield obtained, based on the amount of raw materials employed, but also the desired isomer is obtained in high purity with a minimum of other reaction products.

The following examples are offered as illustrative of the specific practice of the invention, the detailed teachings therein not to be taken as limiting in any respect but merely as illustrative of this invention.

EXAMPLE I

Part A

Into a 1000 ml., 3-necked, round-bottomed flask, equipped with an agitator, a thermometer, and a gas dispenser are introduced 57.0 gms. of orthocresol, 48 gms. of monochloracetic acid, and 42 gms. of sodium hydroxide dissolved in 300 ml. of water. The mixture is then heated with stirring for one-half hour. The reaction mass is then acidified with 20 ml. of concentrated hydrochloric acid in 200 ml. of water to separate unreacted orthocresol. The reaction mass is then heated to a reflux temperature and the unreacted orthocresol is removed as a cresol-water azeotrope by steam distillation.

Part B

To the reaction mass obtained according to Part A, while still at an elevated temperature following the distillation operation, are added 150 ml. of water and 65 gms. of sodium carbonate to adjust the pH to a value between 7.0 and 9.0. The resultant mixture is then cooled to 0° C. and 35 gms. of chlorine is introduced while the temperature of the reaction mass is maintained between 0° and 10° C. The chlorinated mixture thus obtained is acidified to precipitate a solid which is collected by filtration. The solid, 2 - methyl - 4 - chlorophenoxyacetic acid (90% purity), weighs 74.0 gms.

EXAMPLE II

Part A

Into a 1000 ml., 3-necked, round-bottomed flask, equipped with a dropping funnel, an agitator, and a thermometer are introduced 61 gms. of distilled orthocresol, 48 gms. of monochloracetic acid, and 41.5 gms. of sodium hydroxide dissolved in 250 ml. of water. The mixture is then heated to boiling and acidified with 15 ml. of concentrated hydrochloric acid in 200 ml. of water, and the unreacted orthocresol is removed by steam distillation over a period of one-half hour.

To the resultant mixture 37 gms. of potassium carbonate in 1000 ml. of water is then added to adjust the pH to a value between 7.0 and 9.0, and the mixture is cooled to 10° C., whereupon a solid separates and is gradually dissolved by the addition of 300 gms. of crushed ice to the mixture.

Part B

Into the separatory funnel are placed 47 gms. of sodium hydroxide and 250 ml. of crushed ice-water mixture. While the contents of the separatory funnel are maintained at 0° C., 41 gms. of chlorine is introduced into the separatory funnel. The resultant sodium hypochlorite solution is added rapidly to the reaction mass obtained according to Part A above, which is maintained at a temperature of 5° C. during the addition of the hypochlorite. The mixture is stirred for 1.5 hours and is then acidified with concentrated hydrochloric acid and cooled to a temperature of 10° C., whereupon a solid product separates.

The solid, 2-methyl-4-chlorophenoxyacetic acid, is collected by filtration, is slurried with water, filtered, and dried. The weight of the product is 74 gms., which is a yield of 74% based on the chloracetic acid employed.

EXAMPLE III

Part A

Into a 1000 ml., 3-necked, round-bottomed flask are introduced 65.5 gms. of freshly distilled orthocresol, 48.0 gms. of monochloracetic acid, and 42 gms. of sodium hydroxide in 300 ml. of water. The mixture is heated just below reflux temperature for 10 minutes, acidified with 20 ml. of concentrated hydrochloric acid in 20 ml. of water, and then heated at a higher temperature to remove the water-cresol azeotrope by steam distillation. Following the distillation, 80 gms. of solid potassium carbonate is added and the mixture is stirred and cooled to 10° C.

Part B

To the reaction mass obtained according to Part A are added 300 gms. of crushed ice and 38 gms. of chlorine over a period of 40 minutes while the reaction mixture is maintained at a temperature of about 0° C. The resultant chlorinated mixture is agitated for 1 hour at about 10° C. and is acidified with 150 ml. of concentrated hydrochloric acid. The product, 2-methyl-4-chlorophenoxyacetic acid, is collected by filtration, is washed with water, and dried. The dried product weighs 85.0 gms.

EXAMPLE IV

Into a 1000 ml., 3-necked, round-bottomed flask equipped with a thermometer and an agitator are introduced 108 gms. of orthocresol, 104 gms. of monochloracetic acid, and 86 gms. of sodium hydroxide in 600 ml. of water. The reaction mass is heated for one-half hour, after which 10 ml. of concentrated hydrochloric acid is added. The mixture is then heated further to steam distill unreacted orthocresol. To the resultant mixture are then added, with stirring, 300 ml. of water and 120 gms. of sodium carbonate.

The mixture is then placed in a 2-liter, 3-necked, round-bottomed flask equipped with a stirrer, thermometer, and gas dispenser. The mixture is cooled to 0° C. in a salt-ice bath with the direct addition of crushed ice to the solution. While the solution is maintained at approximately 0° C., 72 gms. of chlorine is gradually introduced over a period of 2 hours. The pH of the solution is checked every 10 minutes and maintained between 7.0 and 8.0 with periodic additions of sodium hydroxide.

After all of the chlorine is introduced, the mixture is agitated for 1 hour and then filtered. The resultant solution is acidified with concentrated hydrochloric acid, filtered, and air-dried to produce a yield of 122 gms. of 2-methyl-4-chlorophenoxyacetic acid.

While there have been described various embodiments of the invention, the methods described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of preparing 2-methyl-4-chlorophenoxyacetic acid comprising the steps of reacting orthocresol and chloracetic acid in an alkaline medium, adjusting the pH of the reaction mass to a value within the range of about 7.0 to 9.0, cooling the reaction mass to a temperature less than about 10° C., and adding to the reaction mass a mixture of an alkali metal hydroxide and chlorine in amounts sufficient to produce in solution a chlorinating quantity of hypochlorite ion, and thereafter removing the chlorinated product.

2. The method of preparing 2-methyl-4-chlorophenoxyacetic acid comprising the steps of reacting orthocresol and chloracetic acid in an alkaline medium, adjusting the pH of the reaction mass to a value between about 7.0 and about 9.0, cooling the reaction mass to a temperature less than about 10° C., and adding to the reaction mass a mixture of an alkali metal carbonate and chlorine in amounts sufficient to produce in solution a chlorinating quantity of hypochlorite ion, and thereafter removing the chlorinated product.

3. The process according to claim 1 in which the chlorinated product is removed by acidification of the reaction mass and filtering.

4. The process according to claim 2 in which the chlorinated product is removed by acidification of the reaction mass and filtering.

5. The method of preparing 2-methyl-4-chlorophenoxyacetic acid comprising the steps of reacting orthocresol and chloracetic acid in an alkaline aqueous medium, adding to the reaction mass a quantity of an alkali metal hydroxide, cooling the resultant mixture to a temperature less than 10° C., and thereafter introducing chlorine into the mixture, while maintaining the pH of the mixture at a value within the range from 7.0 to 9.0.

6. The method according to claim 5 in which the pH of the reaction mass is maintained within the range of about 7.0 and 8.0 during the chlorination.

7. A method according to claim 1 in which the chloracetic acid is monochloracetic acid.

References Cited in the file of this patent

UNITED STATES PATENTS 2,602,090    Dosser et al. _____ July 1, 1952

OTHER REFERENCES

Hopkins et al.: Canadian J. Research 24B, 208–10 (1946).